(12) United States Patent
He

(10) Patent No.: US 10,314,244 B2
(45) Date of Patent: Jun. 11, 2019

(54) PLANT GROWING ASSIST DEVICE

(71) Applicant: Chaoqun He, Zhejiang (CN)

(72) Inventor: Chaoqun He, Zhejiang (CN)

( * ) Notice: Subject to any disclaimer, the term of this patent is extended or adjusted under 35 U.S.C. 154(b) by 133 days.

(21) Appl. No.: 15/319,618

(22) PCT Filed: Jul. 28, 2014

(86) PCT No.: PCT/CN2014/083160
§ 371 (c)(1),
(2) Date: Dec. 16, 2016

(87) PCT Pub. No.: WO2015/192442
PCT Pub. Date: Dec. 23, 2015

(65) Prior Publication Data
US 2017/0318751 A1 Nov. 9, 2017

(30) Foreign Application Priority Data

Jun. 16, 2014 (CN) ...................... 2014 2 0318965 U

(51) Int. Cl.
*A01G 9/02* (2018.01)
*A01G 13/02* (2006.01)
*A01G 27/02* (2006.01)

(52) U.S. Cl.
CPC ........... *A01G 9/02* (2013.01); *A01G 13/0281* (2013.01); *A01G 27/02* (2013.01); *A01G 2013/0218* (2013.01)

(58) Field of Classification Search
CPC . A01G 9/02; A01G 9/04; A01G 9/042; A01G 13/0281; A01G 2013/0218;
(Continued)

(56) References Cited

U.S. PATENT DOCUMENTS 3,557,490 A * 1/1971 Delaney ................. A01G 27/06 47/81
3,739,524 A * 6/1973 Rose ...................... A01G 27/04 116/228

(Continued)

FOREIGN PATENT DOCUMENTS

CN 2311130 Y * 3/1999
CN 2551020 Y * 5/2003

OTHER PUBLICATIONS

Martha Stewart Living, Mar. 1995, "Planting a Strawberry Pot", https://www.marthastewart.com/268527/planting-a-strawberry-pot (Year: 1995).*

*Primary Examiner* — Joshua D Huson
(74) *Attorney, Agent, or Firm* — Bay State IP, LLC

(57) ABSTRACT

A new plant growing assist device, comprising a container, a separator in the middle of the container dividing the container into an upper part and a lower part. The upper part keeps the soil for planting, and the lower part to acts as a water reservoir. The bottom of the container is provided with a snorkel, around the snorkel there is a buckle which is used to connect the snorkel with a raw water pipe. The device allows for rain water and surface vapor which would otherwise evaporate into the air to condense and be returned to the soil for plant use. The several through holes of the separator ensure proper ventilation; the monitoring window makes it possible to observe the water level inside the reservoir, the top of the container is covered to prevent water evaporation, and out-extending holes are provided to allow the roots to extend outside.

2 Claims, 3 Drawing Sheets

(58) Field of Classification Search
CPC .... A01G 27/00; A01G 27/005; A01G 27/006; A01G 27/02; A01G 27/04; A01G 27/06; A01C 1/00
See application file for complete search history.

(56) References Cited

U.S. PATENT DOCUMENTS

| | | | | |
|---|---|---|---|---|
| 4,389,815 A * | 6/1983 | English | ............... | A01G 27/04 47/79 |
| 5,509,232 A * | 4/1996 | Laubsch | ............... | A01G 9/028 47/75 |
| 5,644,868 A * | 7/1997 | Lui | ............... | A01G 27/06 47/79 |
| 5,918,415 A * | 7/1999 | Locke | ............... | A01G 27/00 119/74 |
| 5,921,025 A * | 7/1999 | Smith | ............... | A01G 27/06 47/48.5 |
| 6,125,580 A * | 10/2000 | Fan | ............... | A01G 9/04 47/71 |
| 6,131,334 A * | 10/2000 | Fan | ............... | A01G 9/04 47/71 |
| 6,226,921 B1 * | 5/2001 | Kang | ............... | A01G 27/06 47/81 |
| 6,276,090 B1 * | 8/2001 | Lai | ............... | A01G 27/06 47/79 |
| 6,330,724 B1 * | 12/2001 | Belle | ............... | E03C 1/22 4/286 |
| 6,345,470 B1 * | 2/2002 | Slaght | ............... | A01G 27/02 47/79 |
| 6,505,440 B1 * | 1/2003 | Lai | ............... | A01G 27/06 47/79 |
| 6,536,160 B1 * | 3/2003 | Morlier | ............... | A01G 27/06 47/66.7 |
| 6,729,070 B1 * | 5/2004 | Locke | ............... | A01G 27/00 47/79 |
| 6,918,207 B2 * | 7/2005 | Dai | ............... | A01G 31/02 47/81 |
| 8,065,834 B2 | 11/2011 | Eckert | | |
| 8,381,440 B1 * | 2/2013 | Jabs | ............... | A01G 13/0281 47/29.5 |
| 9,185,853 B1 * | 11/2015 | Ascherman | ............... | A01G 9/02 |
| 2001/0039758 A1 * | 11/2001 | Fan | ............... | A01G 9/04 47/80 |
| 2002/0088177 A1 * | 7/2002 | Gergek | ............... | A01G 27/003 47/79 |
| 2005/0011123 A1 * | 1/2005 | Dai | ............... | A01G 31/02 47/79 |
| 2008/0246012 A1 * | 10/2008 | Brush | ............... | E01F 15/0469 256/1 |
| 2012/0005956 A1 * | 1/2012 | Whistle | ............... | A01G 9/02 47/79 |
| 2013/0067812 A1 * | 3/2013 | Masters | ............... | A01G 27/02 47/81 |
| 2013/0305606 A1 * | 11/2013 | Lonsdale | ............... | A01G 27/008 47/66.6 |
| 2014/0325905 A1 * | 11/2014 | Novotny | ............... | A01G 9/02 47/65.5 |
| 2017/0020093 A1 * | 1/2017 | Jeon | ............... | A01G 27/04 |

* cited by examiner

FIG. 2
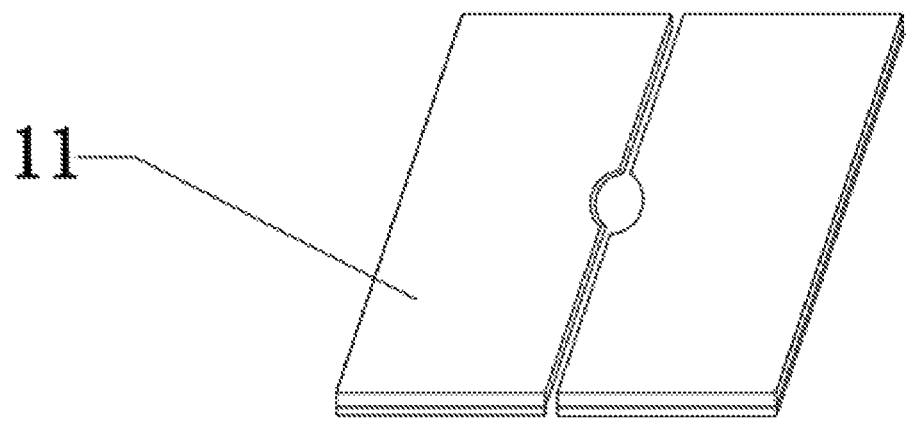
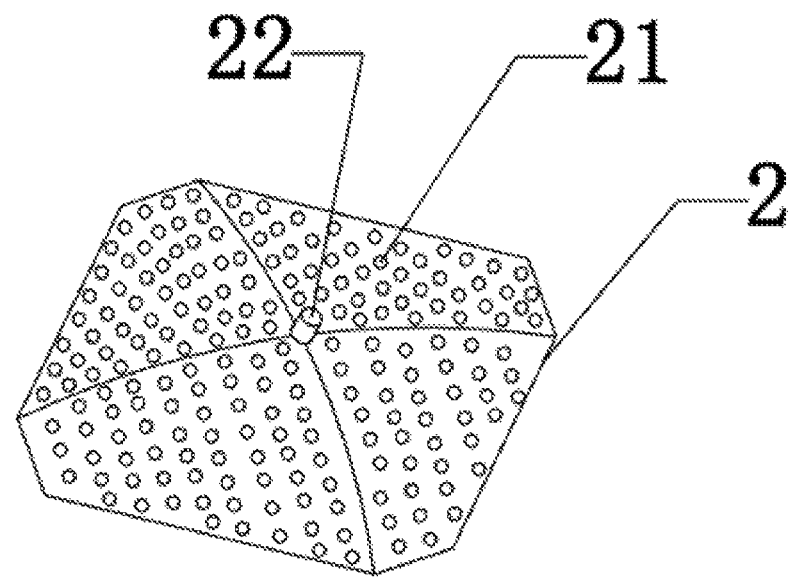
FIG. 3

PLANT GROWING ASSIST DEVICE

CROSS-REFERENCE TO RELATED APPLICATION

This application is for entry into the U.S. National Phase under § 371 for International Application No. PCT/CN2014/083160 having an international filing date of Jul. 28, 2014, and from which priority is claimed under all applicable sections of Title 35 of the United States Code, including but not limited to, Sections 120, 363, and 365(c), and which in turn claims priority under 35 USC 119 to Chinese Patent Application No. 201420318965.0 filed on Jun. 16, 2014.

BACKGROUND OF THE INVENTION

Desert areas are continuously growing. Due to this desertification, many areas of land have become unsuitable for cultivation. Some major causes of desertification include: natural drought, the inability of land to store water because of climate change or overgrazing, and the cultivation of crops that are neither able to store water nor resist the cold. The best way to control desertification is afforestation, but water scarcity presents a major challenge, often making it too difficult for plants to survive in the desert.

The applicant owns the rights to the Chinese Patent CN102939867B (PLANT GROWING ASSIST DEVICE) which can be used for desert afforestation. Although the past few years of actual cultivation experience have yielded very good results, there are still some shortcomings: first, the plastic container has only four holes, which leads to poor ventilation; second, the water level inside the container cannot be observed; third, the container has no cover, which results in water loss as moisture evaporates into the air; fourth, the wall of the container has no holes to enable the roots of the plant to extend outside, this limits growth and prevents the plant from being able to fully utilize resources from outside of the container.

FIELD OF THE INVENTION

This invention pertains to the field of plant cultivation in the dry desert areas; it is a brand-new plant growing assist device.

BRIEF SUMMARY OF THE INVENTION

In order to solve the aforementioned technical problems, this invention introduces a new plant growing assist device, comprising a container, a separator in the middle of the container dividing the container into an upper part, which keeps the soil for planting, and a lower part, which acts as a water reservoir, a snorkel located in the bottom of the container, a buckle located around the snorkel which is used to connect the snorkel with a raw water pipe, and a top plate which covers the upper part of the container.

Further, comprising a monitoring window near the bottom of the container.

Further, the container is equipped with out-extending holes.

Further, the top plate comprises two combined rectangular plates, the centers of the rectangular plates, respectively, have half-circular curves, when the plates are placed together the half-circular curves make a full circle.

Further, the separator has several through holes, the separator has a raised center, and the four corners of the separator have shoulders, which are sloped ledges to keep the separator in place.

Further, the raw water pipe, be it square or circular, has a top cover with vent holes underneath.

This device allows for rain water and surface vapor which would otherwise evaporate into the air to condense and be returned to the soil for plant use. In doing so, this device can effectively recycle water used for irrigation, ensure the adequate hydration of trees planted in the desert, and reduce the cost of desertification control by allowing scare water resources to be used more efficiently. The several through holes of the separator ensure proper ventilation; the monitoring window makes it possible to observe the water level inside the water reservoir; the top of the container is covered to prevent water evaporation; and out-extending holes are provided to allow the extension of the roots.

BRIEF DESCRIPTION OF THE DRAWING

FIG. 2 shows a schematic diagram of Top Plate.
FIG. 3 shows a schematic diagram of the Separator

Figure 1:
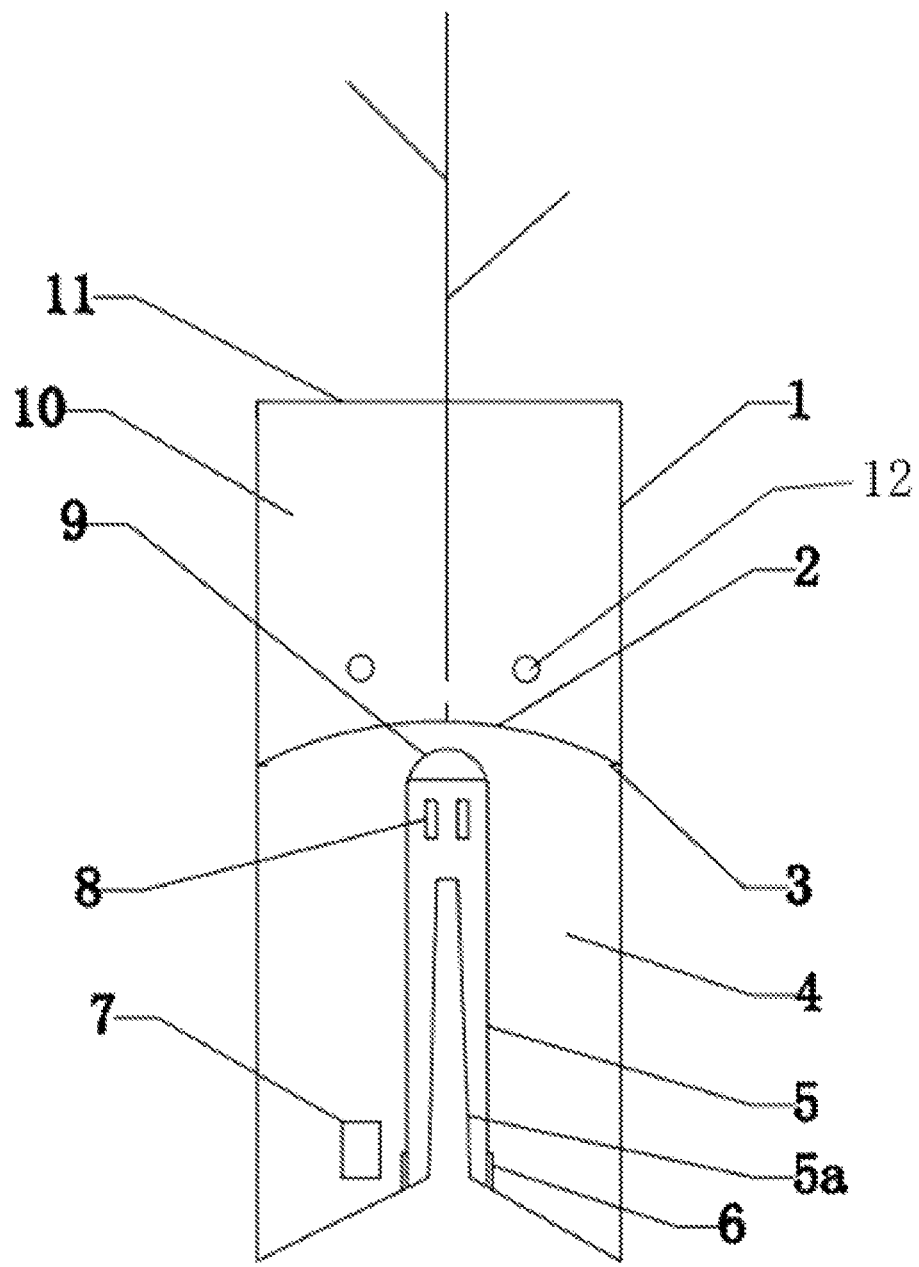
FIG. 1 shows the structure diagram of the Plant Growing Assist Device.

DETAILED DESCRIPTION OF THE INVENTION the following is a detailed description with reference to the Drawing.

As illustrated in FIG. 1, the new plant growing assist device, comprises a container (1), a separator (2) in the middle of the container dividing the container into two parts, the upper part keeps the soil for planting (10), the lower part acts as a water reservoir (4), a snorkel (5a) is located in the bottom of the container, a buckle (6) positioned around this snorkel (5a) which is used to connect the snorkel with the raw water pipe (5), a top plate (11) covering the upper part of the container, a monitoring window (7) near the bottom of the container, out-extending holes (12) in the walls of the container for the roots to extend outside.

Figure 4:
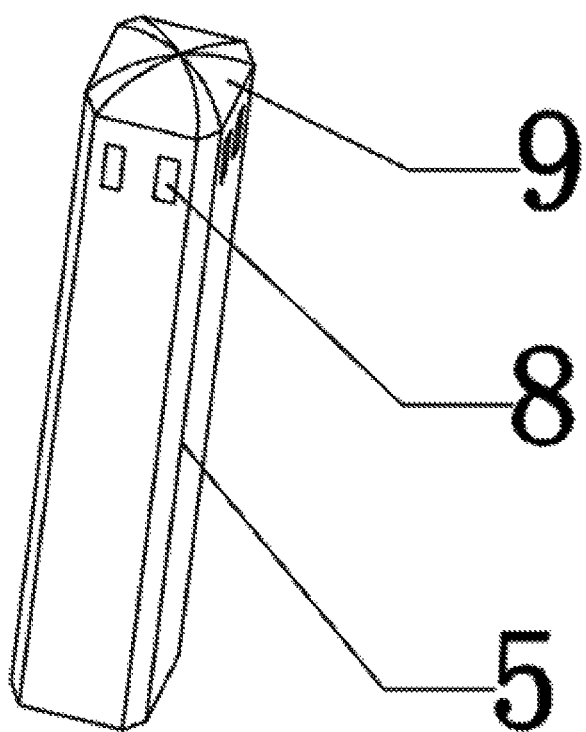
FIG. 4 shows a schematic diagram of the Raw Water Pipe.

As illustrated in FIG. 2, the top plate (11) is made of two combined rectangular pieces, the centers of the rectangular pieces, respectively, have half-circular sections, when the two are placed together they make a full circle, which is provided for the plant to pass through the top plate, the top plate (11) has hanging corners in each of its four sides which are to be inserted into the soil As illustrated in FIG. 3 there are several through holes (21) in the separator (2), which greatly increase the permeability of the container, the separator (2) has a raised center (22) which makes it easy to pick-up and place the separator, the four corners of the separator (2) have shoulders (3) which help fix the separator inside the container.

as illustrated in FIG. 4, the raw water pipe (5), be it square pipe or circular pipe, has a top cover (9) with vent holes (8) underneath.

the water vapor of the dirt in the bottom of the container (1), can reach to the dirt in the top of the separator (2) through the snorkel (5a) so as to maintain the soil moisture. The water vapor turns into water droplets when the water vapor hits the top cover (9) and the water droplets flow through the raw water pipe into the water reservoir (4), the cover (9) is to prevent direct backflow of water into the snorkel (5a). The monitoring Windows (7) can be used to observe the water level when the device is used indoors, the top plate (11) is used to cover the container (1) to prevent water evaporation into the air.

The example of the device shown here is a circular one, but the device is not limited to the circular shape, the device can be a square shape, a rhomboid or other shapes to suit the needs of different terrain. The device can be used for indoor and outdoor planting. The device can also serve as a means of desalination for the water of the desert and the oceans.

The above explained and illustrated are only preferred embodiments of this invention, it should be noted that: those of ordinary skill in the field, on the premises that they follow the principles of this invention, can make a number of improvements and modifications, these improvements and modifications shall also be considered within the scope of protection.

What is claimed is:

1. A device to assist in the growing of plants, the device comprising:
   a container;
   a separator located in the middle of the container, wherein the separator possesses a raised center and includes a plurality of through holes to increase the permeability of the container, the separator dividing the container into two parts comprising:
      an upper part, wherein a soil for planting is located in the upper part further comprising:
         a top plate, wherein the top plate covers the soil and is made of two rectangular pieces, each piece having a half circular section in a center of the piece to create a circle when each piece is placed together to allow a plant to pass through; and
      a lower part, wherein the lower part is configured to act as a water reservoir;
   a snorkel located at a bottom of the container, wherein a buckle connects the snorkel to a raw water pipe, the raw water pipe comprising:
      a top cover; and
      a plurality of vent holes underneath the top cover;
   a monitoring window located near the bottom of the container to observe a water level inside the water reservoir; and
   a plurality of holes located along a wall of the container to allow a root of the plant to extend outside of the container;
   wherein a vapor of the soil located in the bottom of the container is configured to reach the soil at a top of the separator through the snorkel such that the vapor turns into water droplets when the vapor reaches the top cover of the raw water pipe and flows through the raw water pipe into the water reservoir with the top cover preventing the direct backflow of water into the snorkel.

2. The device of claim 1 wherein the raw water pipe is a shape selected from the group consisting of: square and circle.

* * * * *